United States Patent
Wu et al.

(10) Patent No.: US 10,396,925 B2
(45) Date of Patent: Aug. 27, 2019

(54) SMALL CELL INTERFERENCE COORDINATION METHOD AND WIRELESS COMMUNICATION DEVICE

(71) Applicant: SONY CORPORATION, Tokyo (JP)

(72) Inventors: Liang Wu, Jiangsu (CN); Zaichen Zhang, Jiangsu (CN); Jian Dang, Jiangsu (CN); Yingying Yu, Jiangsu (CN); Weiwei Qin, Jiangsu (CN)

(73) Assignee: SONY CORPORATION, Tokyo (JP)

( * ) Notice: Subject to any disclaimer, the term of this patent is extended or adjusted under 35 U.S.C. 154(b) by 86 days.

(21) Appl. No.: 15/525,301

(22) PCT Filed: Nov. 30, 2015

(86) PCT No.: PCT/CN2015/095954
§ 371 (c)(1),
(2) Date: May 9, 2017

(87) PCT Pub. No.: WO2016/086815
PCT Pub. Date: Jun. 9, 2016

(65) Prior Publication Data
US 2018/0287727 A1    Oct. 4, 2018

(30) Foreign Application Priority Data

Dec. 3, 2014   (CN) .......................... 2014 1 0725784

(51) Int. Cl.
*H04J 11/00* (2006.01)
*H04W 84/00* (2009.01)
(Continued)

(52) U.S. Cl.
CPC ........ *H04J 11/0053* (2013.01); *H04B 7/0456* (2013.01); *H04B 17/336* (2015.01);
(Continued)

(58) Field of Classification Search
CPC . H04J 11/0053; H04J 11/0056; H04B 17/336; H04B 7/0456; H04W 16/10; H04W 84/005; H04W 84/045; H04L 27/0008
See application file for complete search history.

(56) References Cited

U.S. PATENT DOCUMENTS 6,317,587 B1 * 11/2001 Tiedemann, Jr. ..... H04W 52/08
455/69
7,385,934 B2   6/2008 Uehara et al.
(Continued)

FOREIGN PATENT DOCUMENTS

| CN | 1515127 A | 7/2004 |
|---|---|---|
| CN | 1640021 A | 7/2005 |
| CN | 102098708 A | 6/2011 |

OTHER PUBLICATIONS

International Search Report dated Mar. 2, 2016 in PCT/CN2015/095954 filed Nov. 30, 2015.

*Primary Examiner* — Andrew Lai
*Assistant Examiner* — Harry H Kim
(74) *Attorney, Agent, or Firm* — Xsensus LLP

(57) ABSTRACT

A small cell interference coordination method and wireless communication device. The method includes: obtaining mobile information of at least one of the small cells; determining relative movement between the small cells according to at least the movement information; estimating a Doppler frequency shift of a signal between small cells according to the relative movement; and implementing an interference alignment policy between small cells according to the estimated Doppler frequency shift.

13 Claims, 6 Drawing Sheets

(51) Int. Cl.
  *H04B 17/336*  (2015.01)
  *H04B 7/0456*  (2017.01)
  *H04L 27/00*   (2006.01)
  *H04W 16/10*   (2009.01)
  *H04W 84/04*   (2009.01)

(52) U.S. Cl.
  CPC ...... *H04J 11/0056* (2013.01); *H04L 27/0008* (2013.01); *H04W 16/10* (2013.01); *H04W 84/005* (2013.01); *H04W 84/045* (2013.01)

(56) References Cited

U.S. PATENT DOCUMENTS

| | | |
|---|---|---|
| 7,558,576 B2 | 7/2009 | Chen et al. |
| 2005/0164644 A1 | 7/2005 | Shinoi et al. |
| 2006/0094363 A1* | 5/2006 | Kang ............... H04L 5/0032 455/63.1 |
| 2006/0293072 A1* | 12/2006 | Tomokiyo ............ H04B 7/002 455/504 |
| 2008/0080637 A1* | 4/2008 | Khan ............... H04B 7/0617 375/267 |
| 2014/0064247 A1* | 3/2014 | Teyeb ............. H04W 36/0083 370/331 |
| 2015/0181502 A1* | 6/2015 | Hans ................ H04W 40/22 455/437 |
| 2017/0013519 A1* | 1/2017 | Hahn ............. H04W 36/0077 |

* cited by examiner

SMALL CELL INTERFERENCE COORDINATION METHOD AND WIRELESS COMMUNICATION DEVICE

FIELD

The present disclosure relates to the field of wireless communication, and particularly to a method for performing interference coordination between small cells and a wireless communication device.

BACKGROUND

With the development of future cellular wireless communication, intra-cell interference and inter-cell interference have become major factors limiting system throughput.

Compared with long term evolution-advanced (LTE-A) technology, a transmission rate of a next-generation wireless communication system (5G) is increased by about 1000 times. It has become a trend to densely deploy small cells, which can effectively improve spatial spectrum efficiency. A mobile small cell is one way of small cell deployment. The mobile small cell includes any small cell which is moving and providing a service for a user, such as a moving bus, a moving car and a moving railcar.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

A method for performing interference coordination between small cells is provided according to an embodiment of the present disclosure. The method includes: obtaining movement information on at least one of the small cells; determining a relative moving condition between the small cells at least based on the movement information; estimating a Doppler shift of a signal between the small cells based on the relative moving condition; and performing an interference alignment strategy between the small cells based on the estimated Doppler shift.

A wireless communication device for macro cell base station side is provided according to another embodiment of the present disclosure. The device includes an obtaining unit, a determining unit, an estimating unit and a triggering unit. The obtaining unit is configured to obtain movement information on at least one of small cells in the macro cell. The determining unit is configured to determine a relative moving condition between the small cells based on the movement information. The estimating unit is configured to estimate a Doppler shift of a signal between the small cells based on the relative moving condition. The triggering unit is configured to trigger an interference alignment strategy to be performed between the small cells based on the estimated Doppler shift.

A wireless communication device for small cell base station side is provided according to yet another embodiment of the present disclosure. The device includes a reporting unit and an adjusting unit. The reporting unit is configured to report movement information on the present small cell to another base station. The adjusting unit is configured to perform interference alignment between the present small cell and the other small cell. The interference alignment is performed based on a Doppler shift estimated based on a relative moving condition between the present small cell and the other small cell.

A wireless communication device for small cell base station side is provided according to still another embodiment of the present disclosure. The device includes a determining unit, an estimating unit and an adjusting unit. The determining unit is configured to determine a relative moving condition between a present small cell and another small cell based on movement information on the present small cell and/or the other small cell. The estimating unit is configured to estimate a Doppler shift of a signal between the present small cell and the other small cell based on the relative moving condition. The adjusting unit is configured to perform interference alignment between the present small cell and the other small cell based on the estimated Doppler shift.

BRIEF DESCRIPTION OF THE DRAWINGS

The present disclosure may be better understood with reference to the description given in conjunction with the drawings hereinafter. The same or similar components are represented by the same or similar reference characters in the drawings. The drawings together with the detailed description below are incorporated in the specification and form a part of the specification, for further exemplifying preferred embodiments of the present disclosure and explaining the principle and advantages of the present disclosure. In the drawings.

DETAILED DESCRIPTION OF EMBODIMENTS

Figure 1:
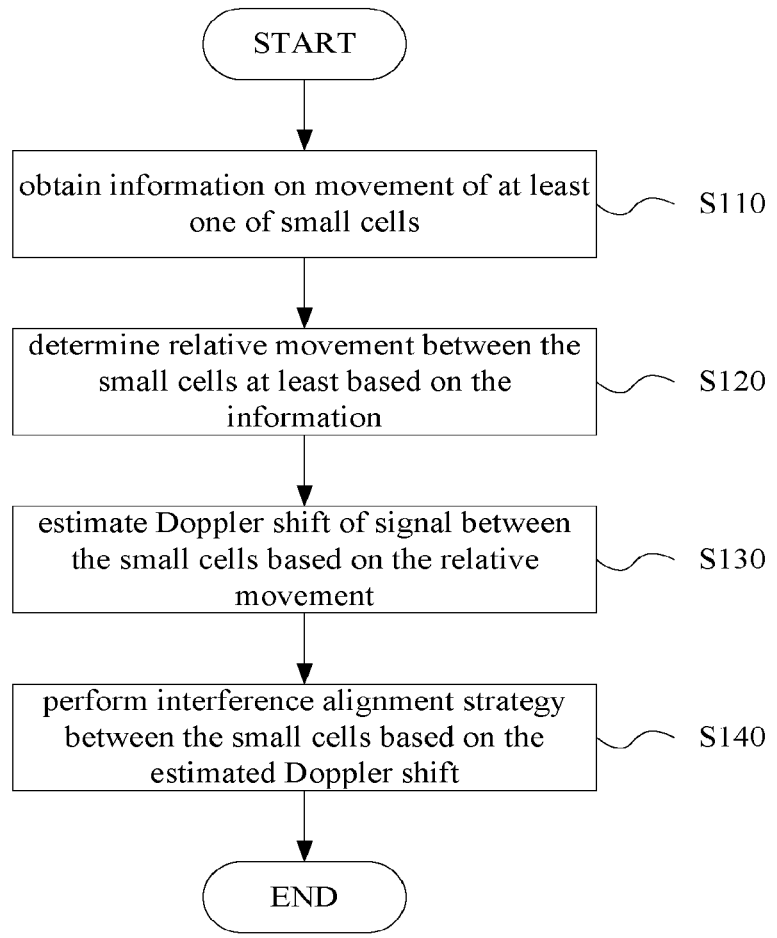
FIG. 1 is a flow diagram of a process example of a method for performing interference coordination between small cells according to an embodiment of the present disclosure.

Hereinafter, the embodiments of the present disclosure are described with reference to the drawings. Elements and features depicted in one of the drawings or one embodiment of the present disclosure may be combined with elements or features depicted in one or more other drawings or embodiments. It should be noted that, representation and description of components and processing, which are known by those skilled in the art and are irrelevant to the present disclosure, are omitted in the drawings and the specification for clarity.

FIG. 1 is an exemplary flow of a method for performing interference coordination between small cells according to an embodiment of the present disclosure. As known in the art, interference coordination includes technology for improving a channel condition of an interfered user by imposing specifically limitation on wireless resource management, thereby acquiring high spectrum efficiency.

A small cell as an object of interference coordination performed by the method according to the embodiment includes at least one mobile small cell. As described above, for example, the mobile small cell includes a moving bus, a moving car and a moving railcar, etc. However, the mobile small cell is not limited to the above examples, and can include any small cell which is moving and providing a service for a user. As shown in the schematic diagram of FIG. 2, a bus having a mobile base station 210 and a car having a mobile base station 220 move at a speed of v1 and a speed of v2, respectively. When the base station 210 and the base station 220 move to be close with each other, a signal coverage range 212 of the base station 210 overlaps with a signal coverage range 222 of the base station 220, thus the base station 210 and the base station 220 may interfere with each other. Furthermore, although the small cells only include mobile small cells in the example in FIG. 2, the present disclosure is not limited thereto. The small cells may include a mobile small cell and a fixed small cell, as long as there is a relative movement between small cells. In addition, although the interference coordination between two small cells is taken as an example in the present disclosure, the number of small cells as an object of the interference coordination is not limited to be two, may also be three or more.

In addition, it should be noted that steps of the method according to the embodiment may be performed at core network side, macro base station side or small cell base station side.

Returning to refer to FIG. 1, in step S110, movement information on at least one of small cells as the object of interference coordination is obtained.

For example, the movement information on the small cell may include a movement speed, a movement direction, a current position and an uplink/downlink receiving angle and so on, of a mobile small cell. The uplink/downlink receiving angle refers to an angle between a receiving antenna pointing of a small cell base station and a movement direction of the small cell. As shown in a schematic diagram of FIG. 3, the dashed line indicates the receiving antenna pointing, the arrow indicates the movement direction of the small cell, and θ indicates the uplink/downlink receiving angle. The movement information on the mobile small cell can be obtained in multiple known ways. For example, the movement information on the mobile small cell can be acquired by using a Global Positioning System (GPS). In another aspect, for a fixed small cell, position information, receiving angle information and so on can be obtained in advance. Furthermore, with respect to a case of multi-path propagation in which a radio wave transmitted from a transmitter reaches an antenna of a receiver along two or more paths, the uplink/downlink receiving angle may include a receiving angle for a main path and a receiving angle for each of multi-path components.

Subsequently, in step S120, a relative movement between the small cells is determined at least based on the obtained movement information.

Figure 3:
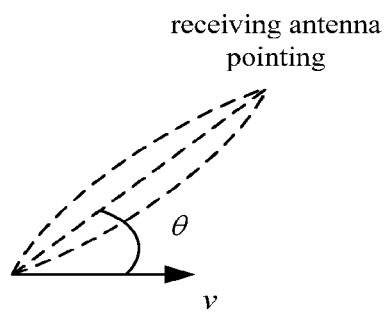
FIG. 3 is a schematic diagram for illustrating a receiving angle of a mobile small cell.

Particularly, in a case that more than one mobile small cell are involved, a relative movement speed is determined based on a movement speed of each of mobile small cells. In this case, the uplink/downlink receiving angle as shown in FIG. 3 refers to an angle between a receiving antenna pointing and the relative movement speed.

Subsequently, in step S130, a Doppler shift of a signal between the small cells is estimated based on the relative movement.

Figure 2:
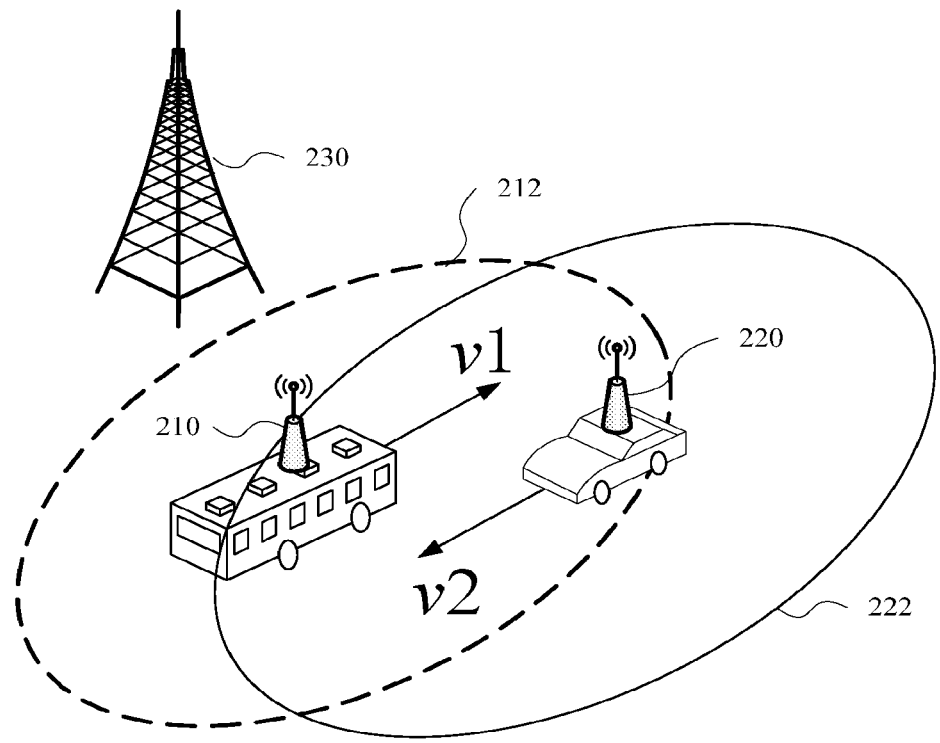
FIG. 2 is a schematic diagram of an example of a mobile small cell.

For example, with respect to an example as shown in FIG. 2, a Doppler shift is calculated based on movement speeds, movement directions and receiving angles of two small cells according to Equation 1 and Equation 2 below.

$$f_{d,1} = \frac{v_1 + v_2}{c} f_c \cos\theta_{r,1} \qquad \text{Equation 1}$$

$$f_{d,2} = \frac{v_1 + v_2}{c} f_c \cos\theta_{r,2} \qquad \text{Equation 2}$$

where $f_{d,1}$ indicates a Doppler shift of a signal received by small cell 1 from small cell 2, $f_{d,2}$ indicates a Doppler shift of a signal received by small cell 2 from small cell 1, $v_1$ and $v_2$ indicate movement velocities of small cell 1 and small cell 2, respectively, c is the speed of light, and $f_c$ indicates a center carrier frequency of the signal, $\theta_{r,1}$ and $\theta_{r,2}$ indicate receiving angles of small cell 1 and small cell 2, respectively.

It should be noted that, in the example, it is assumed that small cell 1 and small cell 2 move towards each other, that is, movement directions of small cell 1 and small cell 2 are opposite, in which case the magnitude of relative speed of small cell 1 and small cell 2 is v1+v2. In a case that the movement directions of small cell 1 and small cell 2 are not opposite, for example, the movement directions are the same, perpendicular to each other, or forming any other angle, v1+v2 in Equation 1 and Equation 2 can be replaced with a relative movement speed between small cell 1 and small cell 2. Correspondingly, $\theta_{r,1}$ and $\theta_{r,2}$ in Equation 1 and Equation 2 are replaced with a receiving angle determined based on the relative speed. In addition, with respect to the multi-path transfer described above, as long as the multi-path component is in the beam pointing of an antenna of a receiver, a Doppler shift of the multi-path component can be estimated based on a receiving angle in a way similar to that described above.

Subsequently, in step S140, an interference alignment strategy is performed between the small cells based on the estimated Doppler shift.

As known in the art, the interference alignment makes interference overlap in a specific subspace at the receiver, to reduce an influence of the interference on a desired signal. By performing the interference alignment strategy in consideration of the Doppler shift, an influence of a relative movement between small cells on an effect of the interference alignment can be reduced.

The interference coordination between small cells can be performed based on various interference alignment methods such as an interference alignment method based on frequency shift and an interference alignment method based on precoding. The interference alignment method based on frequency shift and the interference alignment method based on precoding performed in consideration of the Doppler shift are illustrated below in conjunction with specific embodiments.

[Interference Alignment Based on Frequency Shift]

According to a specific embodiment, performing the interference alignment strategy between small cells based on the estimated Doppler shift includes: in a case that, in frequency domain, only subcarriers with odd indexes (in the present disclosure, the "index" of a carrier may be also referred to as a "sequence number" of the carrier) of a transmission signal of a first small cell carry signals while carriers with even indexes are set to carry no signal, a frequency shift is performed on a transmission signal of a second small cell, so that, in frequency domain, only subcarriers with even indexes of a signal received by the first small cell from the second small cell carry signals while carriers with odd indexes carry no signal. Alternatively, in a case that, in frequency domain, only subcarriers with even indexes of a transmission signal of the first small cell carry signals while carriers with odd indexes are set to carry no signal, a frequency shift is performed on a transmission signal of the second small cell, so that, in frequency domain, only subcarriers with odd indexes of a signal received by the first small cell from the second small cell carry signals while carriers with even indexes carry no signal.

In the method, a frequency of the transmission signal of the second small cell is adjusted, to align a carrier of the second small cell which carries a signal with a carrier of the first small cell which carries no signal, thereby reducing mutual interference between the first small cell and the second small cell. Specifically, the amount of frequency adjustment on the transmission signal of the second small cell is represented as:

$$f_{1,2} = \Delta f - f_{d,1} \quad \text{Equation 3}$$

where $f_{1,2}$ indicates the frequency adjustment on the transmission signal of the second small cell, $\Delta f$ indicates a frequency interval between adjacent subcarriers, $f_{d,1}$ indicates the estimated Doppler shift of a signal received by the first small cell from the second small cell. That is, the frequency adjustment is performed on the second small cell in consideration of the Doppler shift, so as to reduce an influence of a relative movement between small cells on the effect of interference alignment.

In the embodiment, any one of the small cells may be served as an object of frequency adjustment, whereas a small cell as an object of frequency adjustment can be selected according to a preset standard.

For example, in an interference coordination method according to an embodiment, a priority of a small cell can be determined according to a preset standard. In the interference alignment method based on the frequency shift, a frequency shift can be performed on only a small cell having a lower priority.

The priority can be determined based on various preset standards, for example, a small cell having a larger number of users can be determined to have higher priority. Alternatively, in a case that a small cell includes a fixed small cell and a mobile small cell, the fixed small cell can be set to have higher priority. However, the present disclosure is not limited thereto.

Subsequently, a process of the interference alignment method based on frequency shift according to the embodiment of the present disclosure is illustrated in more detail with reference to specific examples. It should be understood that some specific details are given for illustration in the examples below, while the present disclosure is not limited to the specific details.

Example 1

Each small cell includes an orthogonal frequency division multiple address (OFDMA) system, it is assumed that a time domain signal and a frequency domain signal transmitted from a small cell 1 are indicated as $x_1(t)$ and $x_1(f)$, respectively, and are indicated as $x_1(n)$ and $x_1(K)$ in discrete domain, and $$x_1(n) = \text{IFFT}\{X_1(K)\} \quad \text{Equation 4}$$

where IFFT{•} indicates Inverse Fourier Transform. In a condition of additive white Gaussian noise channel, a signal received by a small cell 2 from the small cell 1 may be represented as:

$$y_{2,1}(t) = \frac{1}{N} \sum_{K=0}^{N-1} X_1(K) e^{j2\pi(f_K + f_{d,2})t} \quad \text{Equation 5}$$

where $f_K$ is a frequency point of a k-th subcarrier, N is the total number of subcarriers, and is also a length of Fast Fourier Transform. A sampled signal may be represented as:

$$y_{2,1}(n) = x_1(n) e^{j2\pi \frac{f_{d,2}}{N\Delta f} n} \quad \text{Equation 6}$$

where $\Delta f$ indicates a frequency interval between adjacent subcarriers.

A signal obtained after the Fourier Transform may be represented as:

$$Y_{2,1}(K) = FFT\{y_{2,1}(n)\} = X_1\left(K - \frac{f_{d,2}}{\Delta f}\right) \quad \text{Equation 7}$$

where FFT{ } indicates the Fourier Transform.

Through the wireless channel, a signal received by the small cell 2 may be represented in frequency domain as follows:

$$Y_2(K) = H_{2,1}\left(K - \frac{f_{d,2}}{\Delta f}\right) X_1\left(K - \frac{f_{d,2}}{\Delta f}\right) + H_{2,2}(K) X_2(K) \quad \text{Equation 8}$$

where the first term at the right side of Equation 8 indicates an interference signal, the second term indicates a useful signal, $H_{i,j}(K)$ indicates a frequency response of a channel from a j-th small cell to an i-th small cell on a K-th subcarrier. Similarly, a signal received by the small cell 1 may be represented as:

$$Y_1(K) = H_{1,1}(K) X_1(K) + H_{1,2}\left(K - \frac{f_{d,1}}{\Delta f}\right) X_2\left(K - \frac{f_{d,1}}{\Delta f}\right) \quad \text{Equation 9}$$

In the interference alignment method based on the frequency shift, a signal on a subcarrier of each small cell in frequency domain may be represented as:

$$S_i(K) = \begin{cases} \text{modulated} & K = 1, 3, \ldots, N-1 \\ 0 & K = 0, 2, \ldots, N-2 \end{cases} \quad \text{Equation 10}$$

K indicates an index of the subcarrier, it can be seen that a subcarrier with an odd index is modulated, and a subcarrier with an even index is not modulated and is set as 0. Specifically, i indicates an i-th small cell, it can be seen that only the subcarriers with odd indexes are modulated, and subcarriers with an even indexes are set to carry no signal. In an ideal case, after Doppler shift, the interference signal falls on a subcarrier with an even index. In this case, the interference signal does not affect a performance of the useful signal. However, it is difficult to implement interference alignment in an actual system, the interference alignment can be implemented by preprocessing at a transmitter and postprocessing at a receiver.

Signals transmitted from the small cell 1 and the small cell 2 may be represented, in time domain, as:

$$x_1(t) = s_1(t) = \frac{1}{N} \sum_{K=0}^{N-1} S_1(K) e^{j2\pi f_K t} \quad \text{Equation 11}$$

$$x_2(t) = s_2(t) e^{j2\pi f_{1,2} t} \quad \text{Equation 12}$$
$$= \frac{1}{N} \sum_{K=0}^{N-1} S_2(K) e^{j2\pi f_K t} e^{j2\pi f_{1,2} t}$$

where $$s_2(t) = \frac{1}{N} \sum_{K=0}^{N-1} S_2(K) e^{j2\pi f_K t},$$

$f_{1,2}$ indicates frequency adjustment on the small cell 2. By the frequency adjustment of $f_{1,2}$, the signal of the small cell 2 obtained after the Doppler shift falls on a subcarrier with an even index, of small cell 1. Thus, the interference of the small cell 2 on the small cell 1 can be eliminated. In this case, a signal received by the small cell 1 is represented as:

$$Y_1(K) = H_{1,1}(K)X_1(K) + H_{1,2}\left(K - \frac{f_{d,1}}{\Delta f}\right)X_2\left(K - \frac{f_{d,1}}{\Delta f}\right) \quad \text{Equation 13}$$
$$= H_{1,1}(K)S_1(K) + H_{1,2}\left(K - \frac{f_{d,1}}{\Delta f}\right)S_2\left(K - \frac{f_{d,1}}{\Delta f} - \frac{f_{1,2}}{\Delta f}\right)$$

To make the signal of the small cell 2 fall on the subcarrier with an even index of the small cell 1 through the channel, $f_{1,2}$ should meet the following condition:

$$\frac{f_{d,1}}{\Delta f} + \frac{f_{1,2}}{\Delta f} = 1 \quad \text{Equation 14}$$

In this case, it is set $$f_{1,2} = \Delta f - f_{d,1} \quad \text{Equation 15}$$

In this way, the signal received by the small cell 1 from the small cell 2 is aligned with the subcarrier with an even number, and the signal $S_1(K)$ can be modulated by the small cell 1. A signal received by the small cell 2 may be represented as:

$$Y_2(K) = H_{2,1}\left(K - \frac{f_{d,2}}{\Delta f}\right)X_1\left(K - \frac{f_{d,2}}{\Delta f}\right) + H_{2,2}(K)X_2(K) \quad \text{Equation 16}$$
$$= H_{2,1}\left(K - \frac{f_{d,2}}{\Delta f}\right)S_1\left(K - \frac{f_{d,2}}{\Delta f}\right) + H_{2,2}(K)S_2\left(K - \frac{f_{1,2}}{\Delta f}\right)$$

First, a Fourier transform matrix W is defined as:

$$W = \begin{bmatrix} e^{-j\frac{2\pi}{N}0} & e^{-j\frac{2\pi}{N}0} & e^{-j\frac{2\pi}{N}0} & \cdots & e^{-j\frac{2\pi}{N}0} \\ e^{-j\frac{2\pi}{N}0} & e^{-j\frac{2\pi}{N}} & e^{-j\frac{2\pi}{N}2} & \cdots & e^{-j\frac{2\pi}{N}(N-1)} \\ e^{-j\frac{2\pi}{N}0} & e^{-j\frac{2\pi}{N}2} & e^{-j\frac{2\pi}{N}4} & \cdots & e^{-j\frac{2\pi}{N}2(N-1)} \\ \vdots & \vdots & \ddots & \ddots & \vdots \\ e^{-j\frac{2\pi}{N}0} & e^{-j\frac{2\pi}{N}(N-2)} & e^{-j\frac{2\pi}{N}2(N-2)} & \cdots & e^{-j\frac{2\pi}{N}(N-2)(N-1)} \\ e^{j\frac{2\pi}{N}0} & e^{j\frac{2\pi}{N}(N-1)} & e^{j\frac{2\pi}{N}2(N-1)} & \cdots & e^{j\frac{2\pi}{N}(N-1)(N-1)} \end{bmatrix} \quad \text{Equation 17}$$

A frequency shift matrix is defined as:

$$D(f) = \begin{bmatrix} 1 & 0 & \cdots & 0 \\ 0 & e^{-j\frac{2\pi f}{N\Delta f}} & \cdots & 0 \\ \vdots & \cdots & & \\ 0 & 0 & \cdots & e^{-j\frac{2\pi f}{N\Delta f}(N-1)} \end{bmatrix} \quad \text{Equation 18}$$

Information vectors of an i-the small cell in time domain and in frequency domain are defined as:

$$s_i = [s_i(0), s_i(1), \ldots, s_i(N-1)]^T \quad \text{Equation 19}$$

$$S_i = [S_i(0), S_i(1), \ldots, S_i(N-1)]^T \quad \text{Equation 20}$$

where $[\bullet]^T$ represents transposition.

In small cell 2, a signal from the small cell 1 is multiplied by the frequency shift matrix $D(f_{c,2})$, to be aligned with a subcarrier with an even index, and let $f_{c,2} + f_{d,2} = \Delta f$. The received signal after adjustment may be represented as:

$$\hat{Y}_2 = WD(f_{c,2})y_2 = WD(f_{c,2})D(f_{d,2})\frac{1}{N}W^H H_{2,1} W s_1 + \quad \text{Equation 21}$$
$$WD(f_{c,2})\frac{1}{N}W^H H_{2,2} WD(f_{1,2})s_2$$
$$= WD(f_{c,2} + f_{d,2})\frac{1}{N}W^H H_{2,1} W s_1 + WD(f_{c,2})\frac{1}{N}W^H H_{2,2} WD(f_{1,2})s_2$$

where $y_2 = [y_2(0), y_2(1), \ldots, y_2(N-1)]^T$ indicates a receiving vector before frequency adjustment, and $(\bullet)^H$ indicates conjugate transposition, a channel matrix $H_{i,j}$ is represented as:

$$H_{i,j} = \begin{bmatrix} H_{i,j}(0) & 0 & 0 & \cdots & 0 \\ 0 & H_{i,j}(1) & 0 & \cdots & 0 \\ \vdots & 0 & \ddots & \cdots & 0 \\ 0 & 0 & 0 & \cdots & H_{i,j}(N-1) \end{bmatrix} \quad \text{Equation 22}$$

Then, a subcarrier with an even index, of $\hat{Y}^2$ is set as 0, a signal thus obtained may be represented as:

$$\tilde{Y}_2 = Z\hat{Y}_2 \quad \text{Equation 23}$$

where $$Z = \begin{bmatrix} 1 & 0 & 0 & \cdots & 0 & 0 \\ 0 & 0 & 0 & \cdots & 0 & 0 \\ 0 & 0 & 1 & \cdots & 0 & 0 \\ \vdots & \vdots & \vdots & \ddots & 0 & 0 \\ 0 & 0 & 0 & \cdots & 1 & 0 \\ 0 & 0 & 0 & \cdots & 0 & 0 \end{bmatrix} \quad \text{Equation 24}$$

It can be further obtained that:

$$\begin{aligned}\tilde{Y}_2 = Z\hat{Y}_2 &= ZWD(f_{c,2})y_2 = ZWD(f_{c,2}+f_{d,2})W^H H_{2,1}Ws_1 + \\ &\quad ZWD(f_{c,2})W^H H_{2,2}WD(f_{1,2})s_2 \\ &= ZWD(f_{c,2})W^H H_{2,2}WD(f_{1,2})W^H S_2\end{aligned} \quad \text{Equation 25}$$

$S_2$ can be recovered according to Equation 25.

[Interference Alignment Based on Precoding]

Next, an exemplary process of an interference alignment method based on precoding according to another embodiment of the present disclosure is illustrated. In the embodiment, a process of performing an interference alignment strategy between small cells based on the estimated Doppler shift includes: determining a precoding matrix for eliminating interference between small cells based on the estimated Doppler shift; and determining a receiving matrix for two small cells based on the precoding matrix.

Next, a process of the interference alignment with a method based on precoding according to an embodiment of the present disclosure is illustrated in more detail with reference to a specific example blow. It should be understood that, the present disclosure is not limited specific details in the example below.

Example 2

Assuming that a precoding matrix $P_i$ for a small cell i is a matrix of $$N \times \frac{N}{2},$$

in this case, an information vector $S_i$ is a vector of $$\frac{N}{2} \times 1.$$

Therefore, a signal obtained after precoding may be represented as:

$$X_i = P_i S_i \quad \text{Equation 26}$$

It can be seen that each of N subcarriers carries a signal, however, the number of a really effective data flows is N/2. Signals received by the small cell 1 and the small cell 2 can be represented in frequency domain as follows:

$$Y_1 = H_{1,1}P_1 S_1 + \underbrace{WD(f_{d,1,2})W^H H_{1,2}}_{=\tilde{H}_{1,2}} P_2 S_2 \quad \text{Equation 27}$$

-continued $$Y_2 = \underbrace{WD(f_{d,2,1})W^H H_{2,1}}_{=\tilde{H}_{2,1}} P_1 S_1 + H_{2,2}P_2 S_2 \quad \text{Equation 28}$$

where = indicates definition, since that each of $P_1$ and $P_2$ is a matrix of $$N \times \frac{N}{2},$$

the interference between the small cell 1 and the small cell 2 may be eliminated by designing $P_1$ and $P_2$. In this case, $P_1$ and $P_2$ should meet:

$$\text{span}\{\tilde{H}_{1,2}P_2\}\perp\text{span}\{H_{1,1}P_1\} \text{ - - - >span}\{P_1\}\perp\text{span}\{(H_{1,1}^H)\tilde{H}_{1,2}P_2\} \quad \text{Equation 29}$$

$$\text{span}\{\tilde{H}_{2,1}P_1\}\perp\text{span}\{H_{2,2}P_2\} \text{ - - - >span}\{P_1\}\perp\text{span}\{(\tilde{H}_{2,1}^H)H_{2,2}P_2\} \quad \text{Equation 30}$$

where $\perp$ indicates orthogonalization, span{A} indicates a space spanned by row vectors of matrix A, thus $$\text{span}\{(\tilde{H}_{2,1}^H)H_{2,2}P_2\}=\text{span}\{(H_{1,1}^H)\tilde{H}_{1,2}P_2\} \quad \text{Equation 31}$$

it can be further obtained:

$$\text{span}\{P_2\}=\text{span}\{\text{eigenvectors}\{(\tilde{H}_{2,1}^H,H_{2,2})^{-1}(H_{1,1}^H\tilde{H}_{1,2})\}\} \quad \text{Equation 32}$$

Similarly, $$\text{span}\{P_1\}=\text{span}\{\text{eigenvectors}\{(\tilde{H}_{1,2}^H H_{1,1})^{-1}(H_{2,2}^H\tilde{H}_{2,1})\}\} \quad \text{Equation 33}$$

where eigenvectors{A} indicates eigenvectors of matrix A, an optimal receiving matrix of the small cell 1 may be represented as:

$$U_1 = (H_{1,1}P_1)^H \quad \text{Equation 34}$$

The received signal obtained after processing may be represented as:

$$U_1 Y_1 = (H_{1,1}P_1)^H H_{1,1}P_1 S_1 \quad \text{Equation 35}$$

$S_1$ can be detected by the zero-forcing algorithm or the least mean square error algorithm. Similarly, an optimal receiving matrix of the small cell 2 may be obtained as:

$$U_2 = (H_{2,2}P_2)^H \quad \text{Equation 36}$$

A received signal processed by the small cell 2 may be represented as:

$$U_2 Y_2 = (H_{2,2}P_2)^H H_{2,2}P_2 S_2 \quad \text{Equation 37}$$

Thereby, $S_2$ can be detected.

Next, an exemplary process of interference coordination with a method based on precoding in a case of multi-path propagation is given. It is assumed that a receiving antenna of the small cell 1 has M beam pointings, and a receiving antenna of the small cell 2 has I beam pointings, signals received by the small cell 1 and the small cell 2 may be represented in frequency domain as follows:

$$Y_1 = H_{1,1}P_1 S_1 + \underbrace{\sum_{m=1}^{M} WD(f_{d,(1,2),(m)})W^H H_{(1,2),(m)}}_{=\tilde{H}_{1,2}} P_2 S_2$$

-continued $$Y_2 = \underbrace{\sum_{i=1}^{I} WD(f_{d,(2,1),(i)})W^H H_{(2,1),(i)} P_1 S_1}_{=\tilde{H}_{1,2}} + H_{2,2} P_2 S_2$$

where $f_{d,(1,2),(m)}$ indicates a Doppler shift calculated in a m-th beam direction of the small cell 1, $H_{(1,2),(m)}$ indicates a channel coefficient of an m-th beam pointing from the small cell 2 to the small cell 1, $f_{d,(2,1),(i)}$ indicates a Doppler shift calculated in an i-th beam direction of the small cell 2, $H_{(2,1)(i)}$ indicates a channel coefficient of an i-th beam pointing from the small cell 2 to the small cell 1, = indicates definition. Since that each of $P_1$ and $P_2$ is a matrix of $$N \times \frac{N}{2},$$

interference between the small cell 1 and the small cell 2 can be eliminated by designing $P_1$ and $P_2$.

It should be noted that the calculation method below is similar to the calculation method having one beam pointing described above, whereas definitions for $\tilde{H}_{1,2}$ and $\tilde{H}_{2,1}$ are different from the above definitions.

$P_1$ and $P_2$ here should meet:

$\text{span}\{\tilde{H}_{1,2}P_2\} \perp \text{span}\{H_{1,1}P_1\}$ - - - >span $\{P_1\} \perp \text{span}\{H_{1,1}{}^H\}\tilde{H}_{1,2}P_2\}$ $\text{span}\{\tilde{H}_{2,1}P_1\} \perp \text{span}\{H_{2,2}P_2\}$ - - - >span $\{P_1\} \perp \text{span}\{H_{2,1}{}^H\}\tilde{H}_{2,2}P_2\}$ where $\perp$ indicates perpendicularity, span{A} indicates a space spanned by row vectors of matrix A, thus $\text{span}\{(\tilde{H}_{2,1}{}^H)H_{2,2}P_2\} = \text{span}\{(H_{1,1}{}^H)\tilde{H}_{1,2}P_2\}$ It can be further obtained:

$\text{span}\{P_2\} = \text{span}\{\text{eigenvectors}\{(\tilde{H}_{2,1}{}^H H_{2,2})^{-1} (H_{1,1}{}^H \tilde{H}_{1,2})\}\}$ Similarly, $\text{span}\{P_1\} = \text{span}\{\text{eigenvectors}\{(\tilde{H}_{1,2}{}^H H_{1,1})^{-1} (H_{2,2}{}^H \tilde{H}_{2,1})\}\}$ where eigenvectors{A} indicates eigenvectors of matrix A. Then an optimal receiving matrix of the small cell 1 is:

$U_1 = (H_{1,1}P_1)^H$

The received signal obtained after processing may be represented as:

$U_1 Y_1 = (H_{1,1}P_1)^H H_{1,1} P_1 S_1$ $S_1$ can be detected by the zero-forcing algorithm or the least mean square error algorithm. Similarly, an optimal receiving matrix of the small cell 2 may be obtained as:

$U_2 = (H_{2,2}P_2)^H$

A received signal processed by the small cell 2 is:

$U_2 Y_2 = (H_{2,2}P_2)^H H_{2,2} P_2 S_2$

Thus, $S_2$ can be detected.

In the embodiment described above, by designing a precoding matrix in consideration of the Doppler shift, an influence of a relative movement between small cells on an effect of interference alignment based on precoding can be reduced.

The interference coordination method may be performed between any small cells including a mobile small cell.

However, in a case that possible interference between small cells is low, for example, where there is a far distance between small cells, the interference alignment may be omitted. In other words, the interference alignment process can be performed only in a case that an estimated interference level between small cells is higher than a preset level.

Next, a method for performing interference coordination between small cells according to another embodiment of the disclosure is illustrated with reference to FIG. 4.

Figure 4:
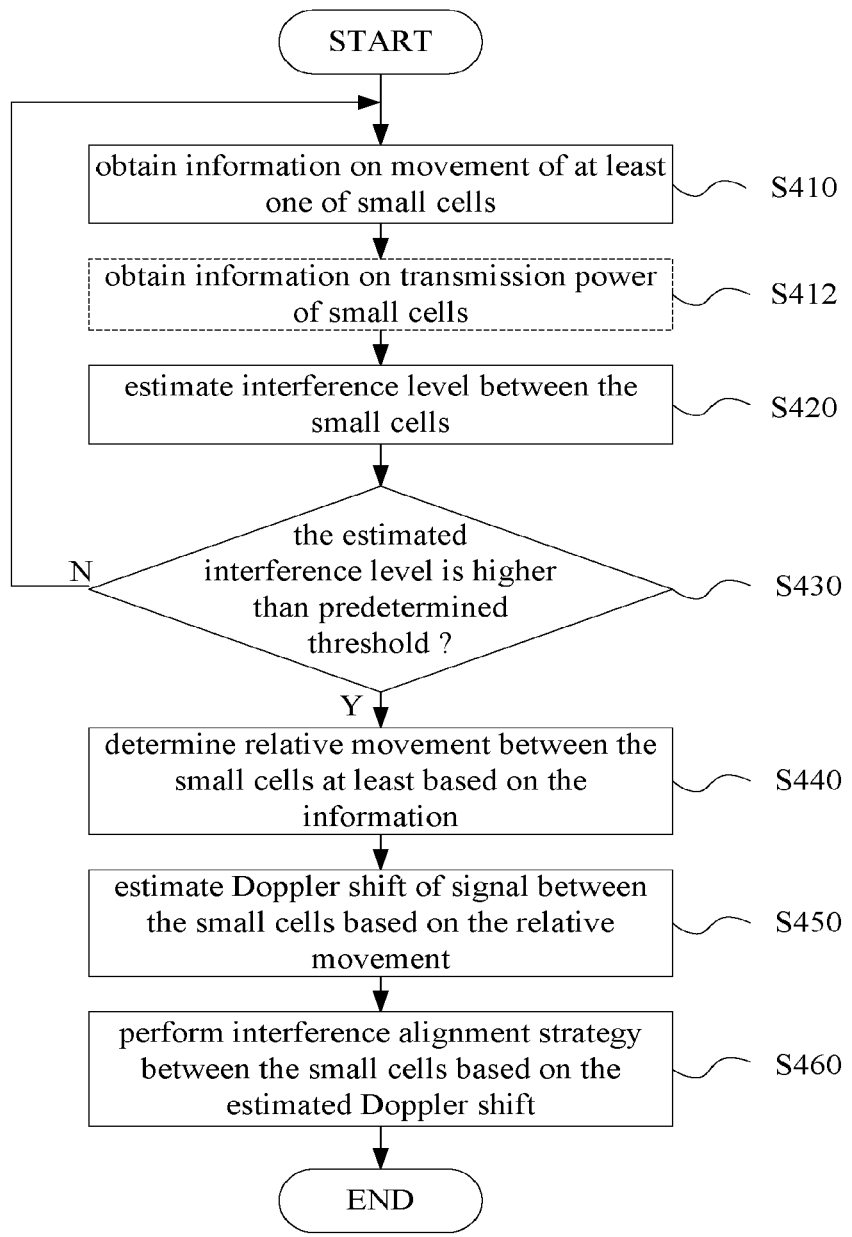
FIG. 4 is a flow diagram of a process example of a method for performing interference coordination between small cells according to another embodiment of the present disclosure.

As shown in FIG. 4, as compared with the embodiment described with reference to FIG. 1, the method according to the present embodiment further includes a step S420 of estimating an interference level between small cells and a step S430 of determining whether the estimated interference level is higher than a predetermined threshold. Steps S410, S440, S450 and S460 in the embodiment are similar to steps S110, S120, S130 and S140 described with reference to FIG. 1, which are not described in detail here.

In step S420, an interference level between the small cells is estimated based on the movement information on the small cell obtained in step S410. For example, a distance between small cells can be determined based on a current positions of the small cells, strength of signals received by the small cells from each other can be estimated based on the distance between small cells and transmission powers of the small cells, to estimate the interference level between the small cells.

FIG. 4 shows an optional step S412 with dashed lines, in step S412, information on transmission power of a small cell is obtained. However, step S412 may be omitted in a case that the transmission power of the small cell is known, for example, in a case that a preset standard transmission power is used by the small cell.

In step S430, it is determined whether the estimated interference level is higher than a predetermined threshold. In a case that the estimated interference level is higher than the predetermined threshold, steps S440 to S460 are performed to reduce interference between small cells. In another aspect, in a case that the estimated interference level is not higher than the predetermined threshold, the process returns to step S410, and steps S440 to S460 for reducing the interference are not performed. The predetermined threshold for the interference level may be set based on a factor such as desired communication quality.

The embodiment of the present disclosure may be applied to an interference coordination between small cells located in a same macro cell, and may also be applied to an interference coordination between mobile small cells located in different macro cells.

According to an embodiment, for small cells are located in different macro cells, transfer of information and/or determination of an interference alignment strategy can be performed by at least one of the macro cells. More specifically, assuming that a small cell a is located at the edge of a macro cell A, and a small cell b is located at the edge of a macro cell B. The macro cell A macro cell B are neighboring cells, there may be interference between the small cell a and the small cell b. Signaling interaction on the interference coordination strategy may be performed by an exemplary process described below.

First, the small cell a and/or the small cell b transmit a movement speed, a movement direction, a current position and an uplink/downlink receiving angle thereof to their macro base stations, respectively, where at least one of the small cell a and the small cell b is a mobile small cell.

The macro base station A and the macro base station B exchange the information of the small cell (the small cell a and the small cell b) served thereby for example via an X2 signaling interface. For example, processing on interference coordination can be performed by one of the macro base station A and the macro base station B as a master base station. In this case, a slave base station can transmit movement information on the small cell thereof to the master base station. In addition, according to an embodiment, the interference alignment is performed only in a case that the estimated interference level between the small cell a and the small cell b is higher than a predetermined threshold (for example, the distance between the small cell a and the small cell b is less than a preset distance). Estimation for the interference level and determination of whether the interference alignment is performed can be carried out only by the master base station.

In addition, the macro base station A and the macro base station B may determine an interference alignment strategy based on priority of small cell, and notify the small cell a and the small cell b of the interference alignment strategy, respectively. Determinations of the priority and the interference alignment strategy may be carried out only by the master base station.

Based on the determined interference alignment strategy, the two small cells may transmit required information (for example a channel coefficient) to the respective macro base stations. The macro base stations exchange the information via, e.g., an X2 interface, and transmit to small cells respectively, and the interference alignment strategy is carried out by the small cells.

The interference coordination method according to the embodiment of the present disclosure is illustrated above. The embodiments of the present disclosure further include a wireless communication device. Hereinafter, the wireless communication device according to the embodiment of the present disclosure is illustrated without repeating certain details discussed above.

FIG. 5 to FIG. 9 show configuration examples of a wireless communication device according embodiments of the present disclosure. The wireless communication devices according to the embodiments of the present disclosure include a wireless communication device at macro cell base station side and a wireless communication device at small cell base station (including a base station of a mobile small cell and a base station of a fixed small cell) side.

Figure 5:
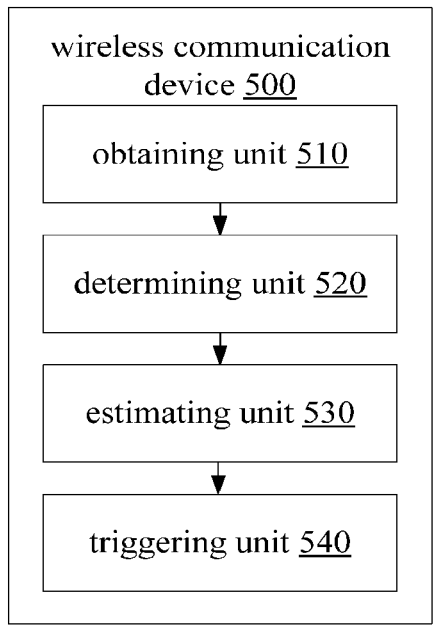
FIG. 5 is a block diagram of a configuration example of a wireless communication device for macro cell base station side according to an embodiment of the present disclosure.

With reference to FIG. 5, a wireless communication device 500 for macro cell base station side according to an embodiment includes an obtaining unit 510, a determining unit 520, an estimating unit 530 and a triggering unit 540.

The obtaining unit 510 may be configured to obtain movement information on at least one of small cells in a macro cell. With respect to a mobile small cell, for example, the information may include a movement speed, a movement direction, a current position and an uplink/downlink receiving angle of the small cell. With respect to a fixed small cell, the information may include a position and an uplink/downlink receiving angle of the cell. However, in a case that the position and the uplink/downlink receiving angle of the fixed small cell are known, the obtaining unit 501 may obtain the information described above only from the mobile small cell. For example, the obtaining unit 501 obtains the information described above from the mobile small cell through a control channel.

The determining unit 520 is configured to determine a relative movement between the small cells at least based on the information obtained by the obtaining unit 510.

The estimating unit 530 is configured to determine a Doppler shift of a signal between the small cells based on the relative movement determined by the determining unit 520 (for example, with reference to Equation 1 and Equation 2).

The triggering unit 540 is configured to trigger an interference alignment strategy to be performed between small cells based on the Doppler shift estimated by the estimating unit.

The triggering here may include transmitting signaling to a related small cell base station to notify the base station of performing the interference alignment strategy. In addition, the signaling may also include providing a parameter for performing the interference alignment strategy to the small cell base station. As illustrated above in combination with specific examples, the interference alignment strategy may include an interference alignment method bases on frequency shift and an interference alignment method based on precoding. Correspondingly, the triggering unit 540 may notify small cells of the amount of frequency adjustment, a parameter on the precoding or the like.

Figure 6:
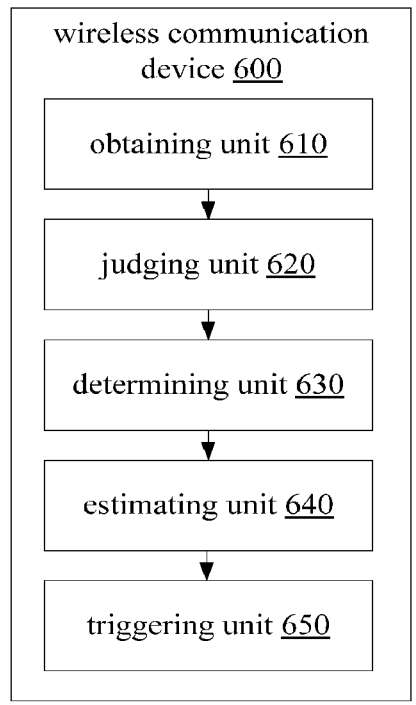
FIG. 6 is a block diagram of a configuration example of a wireless communication device for macro cell base station side according to another embodiment of the present disclosure.

In addition, according to an embodiment, the interference alignment can be triggered only in a case that an estimated interference level between small cells exceeds a preset level. As shown in FIG. 6, as compared with the wireless communication device 500 described above, the wireless communication device 600 at macro cell base station side according to the embodiment further includes a judging unit 620. An obtaining unit 610, a determining unit 630, an estimating unit 640 and a triggering unit 640 of the wireless communication device 600 have similar configurations as the obtaining unit 510, the determining unit 520, the estimating unit 530 and the triggering unit 540 described above, respectively, which are not described here.

The judging unit 620 is configured to estimate an interference level between small cells based on the information obtained by the obtaining unit 610, and determine whether the estimated interference level exceeds a preset level. The determining unit 630, the estimating unit 640 and the triggering unit 650 perform corresponding processing only in a case that the interference level estimated by the judging unit 620 exceeds the predetermined threshold.

The wireless communication device according to the embodiment described above may be used for interference coordination between small cells in a same macro cell. In addition, in a case that a small cell at a peripheral part of the macro cell may interfere with a small cell in another macro cell, interference coordination between small cells in different macro cells can be performed by interaction between macro base stations.

Figure 7:
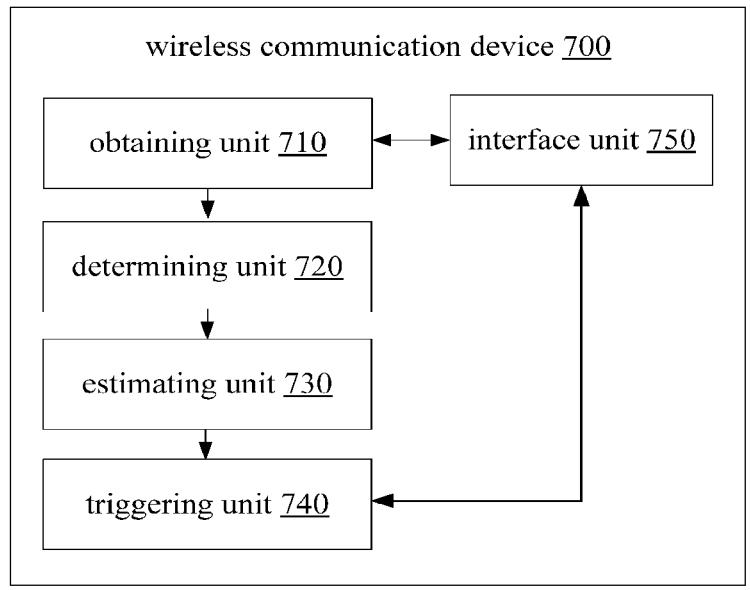
FIG. 7 is a block diagram of a configuration example of a wireless communication device for macro cell base station side according to yet another embodiment of the present disclosure.

As shown in FIG. 7, as compared with the wireless communication device 500 described above, a wireless communication device 700 at macro cell base station side according to an embodiment further includes an interface unit 750. A determining unit 720 and the estimating unit 730 of the wireless communication device 700 have similar configurations as the determining unit 520 and the estimating unit 530 described above, which are not described here.

The interface unit 750 is configured to receive information related to a movement of a small cell from another base station or transmit the information to the other base station. The obtaining unit 710 is configured to obtain movement information of a small cell in the present macro cell, and may obtain, from the interface unit 750, the movement information on the small cell provided from another macro cell.

The triggering unit 740 may trigger the small cell in the present macro cell to perform an interference alignment strategy. In addition, the triggering unit 740 may notify, by the interface unit 750, another macro cell of triggering the small cell thereof to perform an interference alignment strategy.

The wireless communication device at the macro cell base station side according to the embodiment of the present disclosure is described above. Next, a wireless communication device at small cell base station side according to an embodiment of the present disclosure is illustrated.

Figure 8:
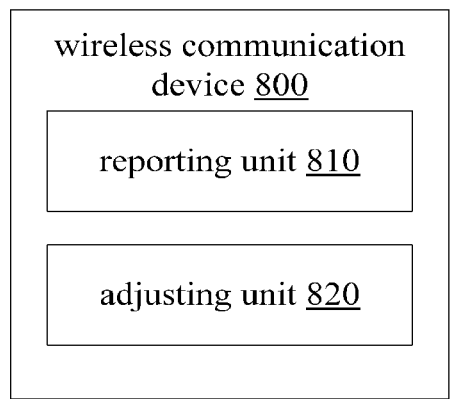
FIG. 8 is a block diagram of a configuration example of a wireless communication device for small cell base station side according to an embodiment of the present disclosure.

The wireless communication device 800 as shown in FIG. 8 may be applied at mobile small cell base station side. The wireless communication device 800 includes a reporting unit 810 and an adjusting unit 820.

The reporting unit 810 is configured to report movement information on the present small cell to another base station. It should be noted that the other base station here may include a macro cell base station or another small cell base station. As mentioned above, a determining process on the interference coordination according to the present disclosure can be performed at a core network side, a macro base station side or a small cell base station side. In a case that the determining process on the interference coordination is performed at the core network side or the macro base station side, the reporting unit 810 may report the movement information to the macro base station. In a case that the determining process on the interference coordination is performed at another small cell base station side, the reporting unit 810 may report the movement information to the macro base station, and the macro base station transmits the movement information to a base station of the other small cell. Alternatively, the reporting unit 810 can directly transmit the information to the other small cell base station via a communication interface between the small cells base stations.

The adjusting unit 820 is configured to perform interference alignment between the present small cell and another small cell. Specifically, the interference alignment performed by the adjusting unit 820 is performed based on a Doppler shift estimated based on the relative movement between the present small cell and the other small cell. With reference to the embodiment above, the adjusting unit 820 may adjust a transmission signal of the present small cell by the interference alignment method based on frequency shift and the interference alignment method based on precoding, to perform interference alignment.

In the embodiment, the wireless communication device 800 provides the movement information on the present small cell to the other base station, and performs the interference alignment strategy determined at the other base station side. However, the interference alignment strategy may also be carried out at small cell base station side.

Figure 9:
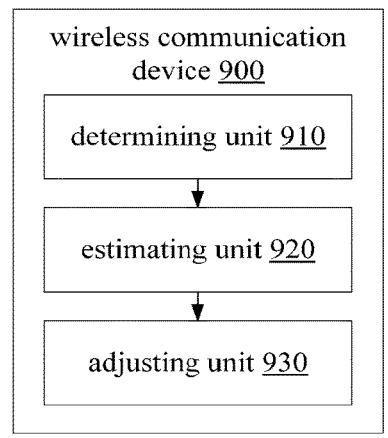
FIG. 9 is a block diagram of a configuration example of a wireless communication device for small cell base station side according to another embodiment of the present disclosure.

A wireless communication device 900 as shown in FIG. 9 may be applied at mobile small cell base station side or fixed small cell base station side. The wireless communication device 900 includes a determining unit 910, an estimating unit 920 and an adjusting unit 930.

The determining unit 910 is configured to determine a relative movement between the present small cell and another small cell based on movement information on the present small cell and/or the other small cell. As described above, the mobile information may include a movement speed, a movement direction, a current position and an uplink/downlink receiving angle of a mobile small cell, and a position and an uplink/downlink receiving angle of a fixed small cell. The determining unit 910 may determine the relative movement based the movement information on the present small cell and movement information obtained from the other small cell (for example, via a macro base station or directly from the other small cell base station).

The estimating unit 920 is configured to estimate a Doppler shift of a signal between the present small cell and the other small cell (for example, with reference to Equation 1 and Equation 2) based on the relative movement determined by the determining unit 910.

The adjusting unit 930 is configured to perform interference alignment between the present small cell and the other small cell based on the Doppler shift estimated by the estimating unit 920. With reference to the embodiment above, the adjusting unit 930 may perform interference alignment by the interference alignment method based on frequency shift and the interference alignment method based on precoding. Furthermore, in addition to adjusting the transmission signal of the present small cell to perform interference alignment, the adjusting unit 930 may also notify the other small cell of the amount of frequency adjustment and a parameter for precoding, to enable the other small cell to adjust the transmission signal to implement the interference alignment.

In addition to the embodiments described above, the embodiments of the present disclosure further include a communication control device including a circuit or one or more processors configured to: obtain movement information on at least one of small cells; determine a relative movement between the small cells at least based on the movement information; estimate a Doppler shift of signals between the small cells based on the relative movement; and trigger an interference alignment strategy to be performed between the small cells based on the estimated Doppler shift.

An electronic device for macro base station side is provided according to another embodiment of the present disclosure, which includes a circuit or one or more processors configured to: obtain movement information on at least one of small cells in the macro cell; determine a relative movement between the small cells at least based on the movement information; estimate a Doppler shift of signals between the small cells based on the relative movement; and trigger an interference alignment strategy to be performed between the small cells based on the estimated Doppler shift.

An electronic device for small cell base station side is provided according to another embodiment of the present disclosure, which includes a circuit or one or more processors configured to: report movement information on the present small cell to another base station; and perform interference alignment between the present small cell and the other small cell. Specifically, the interference alignment is performed based on a Doppler shift estimated according to a relative movement between the present small cell and the other small cell.

An electronic device for small cell base station side is provided according to another embodiment of the present disclosure, which includes a circuit or one or more processors configured to: determine a relative movement between the present small cell and another small cell based on movement information on the present small cell and/or the other small cell; estimate a Doppler shift of a signal between the present small cell and the other small cell based on the relative movement; and perform interference alignment between the present small cell and the other small cell based on the estimated Doppler shift.

As an example, all steps of the method described above, and all component modules and/or units of the apparatus described above may be implemented with software, firmware, hardware or a combination thereof. In a case that the steps or component modules are implemented with software or firmware, programs constituting the software for implementing the method described above is installed into a computer (for example, a universal computer 1000 as shown in FIG. 10) with a dedicated hardware structure from a storage medium or network, the computer can execute various functions when installed with various programs.

Figure 10:
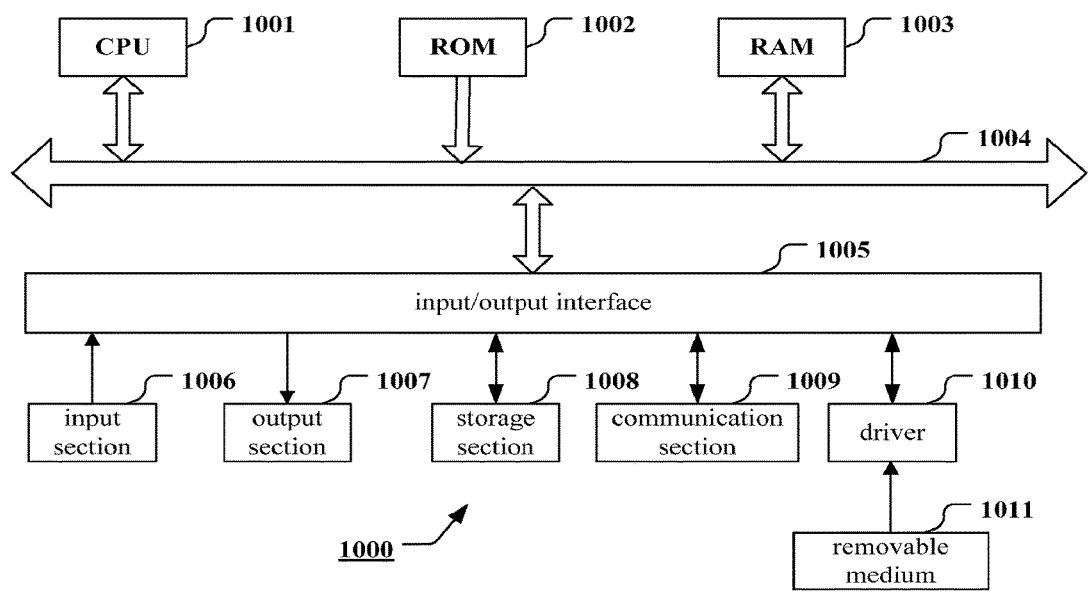
FIG. 10 is a block diagram of an exemplary structure of a computer for implementing the method and device according the present disclosure.

In FIG. 10, a central processing unit (CPU) 1001 executes various processing according to a program stored in a read-only memory (ROM) 1002 or a program loaded to a random access memory (RAM) 1003 from a storage section 1008. The data needed for the various processing of the CPU 1001 may be stored in the RAM 1003 as needed. The CPU 1001, the ROM 1002 and the RAM 1003 are linked with each other via a bus 1004. An input/output interface 1005 is also linked to the bus 1004.

The following components are linked to the input/output interface 1005: an input section 1006 (including keyboard, mouse and the like), an output section 1007 (including displays such as a cathode ray tube (CRT), a liquid crystal display (LCD), a loudspeaker and the like), a storage section 1008 (including hard disc and the like), and a communication section 1009 (including a network interface card such as a LAN card, modem and the like). The communication section 1009 performs communication processing via a network such as the Internet. A driver 1010 may also be linked to the input/output interface 1005 as needed. A removable medium 1011, for example, a magnetic disc, an optical disc, a magnetic optical disc, a semiconductor memory and the like, may be installed to the driver 1010, so that the computer program read therefrom is installed in the storage section 1008 as appropriate.

In the case where the foregoing series of processing is achieved with software, programs forming the software are installed from a network such as the Internet or a memory medium such as the removable medium 1011.

It should be appreciated by those skilled in the art that the memory medium is not limited to the removable medium 1011 shown in FIG. 10, which has program stored therein and is distributed separately from the apparatus so as to provide the programs to users. The removable medium 1011 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1002 and the storage section 1008 in which programs are stored, and can be distributed to users along with the device in which they are incorporated.

The embodiments of the present disclosure further relates to a program product on which machine-readable instruction codes are stored. The machine-readable instruction codes can enable the machine to execute the methods according to the embodiments of the present disclosure described above when being read and executed by the machine.

Accordingly, a storage medium for carrying the program product on which the machine-readable instruction codes are stored is also included in the present disclosure. The storage medium includes but not limited to a floppy disk, an optical disk, a magneto-optical disk, a memory card, a memory stick and the like.

The embodiments of the present disclosure further relates to the following electronic device. In a case that the electronic device is applied into a base station side, the electronic device can be implemented as any types of evolved node B (eNB), such as a macro eNB and a small eNB. The small eNB may be an eNB of a cell having a smaller coverage range than a macro cell, such as a pico-cell eNB, micro eNB and a family (femto-cell) eNB. Alternatively, the electronic device may also be implemented as any types of base stations, such as a NodeB and a base transceiver station (BTS). The electronic device may include an entity configured to control wireless communication (also referred to a base station device); and one or more remote radio head (RRH) arranged at locations different from the entity. In addition, any types of terminals described below can operate as a base station by temporarily or semi-persistently performing a function of the base station.

In a case that the electronic device is applied into a use equipment side, the electronic device can be implemented as a mobile terminal (such as a smart phone, a panel personnel computer (PC), a notebook PC, a portable game terminal, a portable/dongle mobile router and a digital camera device) or a vehicle terminal (such as an automobile navigation device). In addition, the electronic device may be a wireless communication module (such as an integrated circuit module including one or more wafers) installed on each of the terminals described above.

In the above description of embodiments of the present disclosure, a feature described and/or illustrated in an embodiment may be applied to one or more other embodiments in a same or similar manner, or may be combined with a feature in other embodiments, or may replace a feature in other embodiments.

It should be emphasized that, the term "include/contain", as used in the present disclosure, means existence of a feature, an element, a step or a component, but does not exclude existence or addition of one or more other features, elements, steps or components.

In the above examples and embodiments, numeric reference characters are used for representing various steps and/or units. Those skilled in the art should understand that the reference characters are only used for facilitating description and illustration rather than representing an order or other limits.

Furthermore, the methods in the present disclosure are not limited to be performed in the time order as described, but may be performed in other time orders or in parallel or independently. Therefore, the performing order of the method described in the present disclosure is not a limit to the technical scope of the present disclosure.

Although the invention is disclosure by describing the above embodiment of the present disclosure, it should be noted that each of the above example and embodiment is not for limiting but for illustrating. Those skilled in the art may make various modifications, improvements and equivalents within the spirit and scope of the appended claims. The modifications, improvements and equivalents should also be included in the protection scope of the present disclosure.

The invention claimed is:

1. A method for performing interference coordination between small cells, comprising:
obtaining movement information on at least one of the small cells;
determining a relative moving condition between the small cells at least based on the movement information;
estimating a Doppler shift of a signal between the small cells based on the relative moving condition; and
performing an interference alignment strategy between the small cells based on the estimated Doppler shift, wherein
the interference alignment is performed by a method based on frequency shift, and the interference alignment performed by the method based on frequency shift comprises:
in a case that, in frequency domain, subcarriers with first numbers of a transmission signal of a first small cell of the at least one of the small cells carry signals while subcarriers with the other numbers are set to carry no signal, performing a frequency shift on a transmission signal of a second small cell of the at least one small cells, so that, in frequency domain, subcarriers with the first numbers of a signal received by the first small cell from the second small cell carry no signals while subcarriers with the other numbers carry signals.

2. The method according to claim 1, wherein the movement information comprises one or more of:
a movement speed, a movement direction, a current position and an angle between a receiving antenna pointing and the movement direction, of at least one of the small cells.

3. The method according to claim 1, further comprising:
estimating an interference level between the small cells based on the movement information; and
performing the interference alignment in a case that the estimated interference level is higher than a predetermined threshold.

4. The method according to claim 3, further comprising obtaining information on transmission power of the small cells.

5. The method according to claim 1, wherein the amount of frequency adjustment on the transmission signal of the second small cell is:

$$f_{1,2} = \Delta f - f_{d,1}$$

where $f_{1,2}$ indicates the frequency adjustment on the transmission signal of the second small cell, $\Delta f$ indicates a frequency interval between adjacent subcarriers, and $f_{d,1}$ indicates the estimated Doppler shift of the signal received by the first small cell from the second small cell.

6. The method according to claim 5, further comprising a step of determining priorities of the small cells according to a predetermined criterion,
wherein the priority of the second small cell is lower than the priority of the first small cell.

7. The method according to claim 1, wherein the interference alignment is performed by a method based on precoding.

8. The method according to claim 7, wherein the interference alignment performed by a method based on precoding comprises:
determining, based on the estimated Doppler shift, a precoding matrix for eliminating interference between the small cells; and
determining a receiving matrix of two small cells based on the precoding matrix.

9. The method according to claim 1, wherein the small cells comprise small cells located in different macro cells respectively, and
at least one of the macro cells is configured to at least one of
transfer of the movement information and determine the interference alignment strategy.

10. A wireless communication device, comprising:
a processing circuitry configured to:
obtain movement information on at least one of small cells in a macro cell;
determine a relative moving condition between the small cells at least based on the movement information;
estimate a Doppler shift of a signal between the small cells based on the relative moving condition; and
trigger an interference alignment strategy to be performed between the small cells based on the estimated Doppler shift, wherein
the interference alignment is performed based on frequency shift that comprises:
in a case that, in frequency domain, subcarriers with first numbers of a transmission signal of a first small cell of the at least one of the small cells carry signals while subcarriers with the other numbers are set to carry no signal, the processing circuitry performs a frequency shift on a transmission signal of a second small cell of the at least one small cells, so that, in frequency domain, subcarriers with the first numbers of a signal received by the first small cell from the second small cell carry no signals while subcarriers with the other numbers carry signals.

11. The wireless communication device according to claim 10, the processing circuity is further configured to:
determine whether an interference level between the small cells estimated based on the movement information exceeds a predetermined threshold; and
triggers the interference alignment in a case that the estimated interference level is higher than the predetermined threshold.

12. The wireless communication device according to claim 10, the processing circuity is further configured to:
to receive the movement information from another base station or transmit the movement information to another base station.

13. A wireless communication device, comprising:
a processing circuitry configured to:
determine a relative moving condition between the present small cell and another small cell based on movement information on the present small cell and/or the other small cell;
estimate a Doppler shift of a signal between the present small cell and the other small cell based on the relative moving condition; and
perform interference alignment between the present small cell and the other small cell based on the estimated Doppler shift, wherein
the interference alignment is performed based on frequency shift that comprises:
in a case that, in frequency domain, subcarriers with first numbers of a transmission signal of a first small cell of the at least one of the small cells carry signals while subcarriers with the other numbers are set to carry no signal, the processing circuitry performs a frequency shift on a transmission signal of a second small cell of the at least one small cells, so that, in frequency domain, subcarriers with the first numbers of a signal received by the first small cell from the second small cell carry no signals while subcarriers with the other numbers carry signals.

* * * * *